United States Patent
Booher et al.

(10) Patent No.: US 9,429,643 B2
(45) Date of Patent: Aug. 30, 2016

(54) COHERENT AGGREGATION FROM MULTIPLE DIVERSE SOURCES ON A SINGLE DISPLAY

(71) Applicant: RAYTHEON COMPANY, Waltham, MA (US)

(72) Inventors: Jim L. Booher, Fullerton, CA (US); Christopher R. Eck, St. Petersburg, FL (US); Stefan Badstuebner, Brea, CA (US); Ron C. Williamson, Fullerton, CA (US); John A. Schlundt, Fort Wayne, IN (US); Annette R. Mueller, Brea, CA (US)

(73) Assignee: Thales-Raytheon Systems Company LLC, Fullerton, CA (US)

( * ) Notice: Subject to any disclaimer, the term of this patent is extended or adjusted under 35 U.S.C. 154(b) by 653 days.

(21) Appl. No.: 13/859,643

(22) Filed: Apr. 9, 2013

(65) Prior Publication Data
US 2014/0300508 A1 Oct. 9, 2014

(51) Int. Cl.
*G01S 7/22* (2006.01)
*G01S 7/04* (2006.01)
*G01S 13/66* (2006.01)
(Continued)

(52) U.S. Cl.
CPC .............. *G01S 7/04* (2013.01); *G01S 13/66* (2013.01); *G01S 13/726* (2013.01); *G08G 5/0021* (2013.01); *G01S 7/22* (2013.01); *G08G 5/0078* (2013.01); *G08G 5/0082* (2013.01)

(58) Field of Classification Search
CPC ........ G01S 7/04; G01S 13/726; G01S 13/66; G01S 7/22; G08G 5/0021; G08G 5/0078; G08G 5/0082

USPC ........ 342/176, 179, 182–183, 29–37, 57–59, 342/67, 95–97
See application file for complete search history.

(56) References Cited

U.S. PATENT DOCUMENTS 5,107,271 A 4/1992 White
5,454,064 A 9/1995 Castelaz
(Continued)

OTHER PUBLICATIONS

Written Opinion of the International Searching Authority for International Application No. PCT/US2014/015649 filed Feb. 10, 2014, Written Opinion of the International Searching Authority mailed Oct. 21, 2014 (7 pgs.).

(Continued)

*Primary Examiner* — John B Sotomayor
(74) *Attorney, Agent, or Firm* — Lewis Roca Rothgerber Christie LLP

(57) ABSTRACT

A system for tracking objects. Objects such as aircraft, ground vehicles, or vessels may be sensed with various sensors, including an Integrated Broadcast Service (IBS) (220), an Advanced Field Artillery Tactical Data System (AFATDS) (225), a network (230) of airborne radar sensors, a network (235) of aircraft each reporting its own position, a Blue Force Tracker (BFT) (240), and a network (245) of ground-based mobile radar sensors. Data from each sensor or network of sensors may also be fed, via a display interface layer (250), to a display. A tracker which may be referred to as a coherent aggregator (120) receives input from sensors or other trackers and also from an operator. The operator monitors the display and provides input to the coherent aggregator (120) to assist the coherent aggregator (120) in inferring tracks from measurement reports. Multiple coherent aggregators, in communication with each other and loosely coupled, may be operated simultaneously.

16 Claims, 5 Drawing Sheets

(51) Int. Cl.
*G01S 13/72* (2006.01)
*G08G 5/00* (2006.01)

(56) References Cited

U.S. PATENT DOCUMENTS

| | | | |
|---|---|---|---|
| 5,491,645 A | 2/1996 | Kennedy et al. | |
| 5,543,802 A | 8/1996 | Villevieille et al. | |
| 6,246,320 B1 * | 6/2001 | Monroe | B64D 45/0015 340/506 |
| 6,260,759 B1 * | 7/2001 | Nguyen | G01S 7/066 235/411 |
| 6,631,384 B1 * | 10/2003 | Richman | G06F 17/30539 |
| 6,920,486 B2 | 7/2005 | Kiiskinen | |
| 6,992,596 B2 | 1/2006 | Cole et al. | |
| 7,017,105 B2 | 3/2006 | Flanagin et al. | |
| 7,222,139 B2 | 5/2007 | Mau | |
| 7,231,596 B2 | 6/2007 | Koren | |
| 7,256,729 B2 | 8/2007 | Bümmerstede | |
| 7,499,899 B2 | 3/2009 | Siegel et al. | |
| 7,706,979 B1 | 4/2010 | Herwitz | |
| 7,719,461 B1 | 5/2010 | Mookerjee et al. | |
| 7,734,826 B2 | 6/2010 | Brown et al. | |
| 7,779,299 B2 | 8/2010 | Sethi et al. | |
| 7,805,403 B2 | 9/2010 | Freedman | |
| 7,945,582 B2 | 5/2011 | Ubalde et al. | |
| 9,134,398 B2 * | 9/2015 | Dupray | G01S 1/026 |
| 9,171,473 B1 * | 10/2015 | McNally | G08G 5/003 |
| 2003/0065409 A1 * | 4/2003 | Raeth | G05B 9/02 700/31 |
| 2004/0225432 A1 | 11/2004 | Pilley et al. | |
| 2005/0004759 A1 | 1/2005 | Siegel | |
| 2007/0018887 A1 * | 1/2007 | Feyereisen | G01C 23/00 342/176 |
| 2007/0208582 A1 | 9/2007 | Chellam et al. | |
| 2008/0052621 A1 | 2/2008 | Oliverio et al. | |
| 2008/0162728 A1 | 7/2008 | Robeal et al. | |
| 2009/0138526 A1 | 5/2009 | Linkert et al. | |
| 2014/0086191 A1 * | 3/2014 | Berntsen | H01Q 1/34 370/329 |
| 2014/0300508 A1 * | 10/2014 | Booher | G01S 7/04 342/176 |

OTHER PUBLICATIONS

International Search Report for International Application No. PCT/US2014/015649 filed Feb. 10, 2014, International Search Report dated Oct. 14, 2014 and mailed Oct. 21, 2014 (4 pgs.).

* cited by examiner

COHERENT AGGREGATION FROM MULTIPLE DIVERSE SOURCES ON A SINGLE DISPLAY

STATEMENT REGARDING FEDERALLY SPONSORED RESEARCH OR DEVELOPMENT

This invention was made with U.S. Government support under contract No. M67854-11-C-0205, awarded by the United States Marine Corps. The U.S. Government has certain rights in this invention.

BACKGROUND

1. Field

One or more aspects of embodiments according to the present invention relate to sensing objects using sensors or networks of sensors, and inferring trends, which may also be referred to as tracks, in the motion of the objects.

2. Description of Related Art

Systems for tracking objects such as aircraft, ground vehicles, and vessels, may be constructed using various sensors and other means for detecting, identifying, and locating such objects. Sensors may use radar, for example, or video images, or in some cases an object may transmit electromagnetic radiation, intentionally or unintentionally providing information about the object.

A system for tracking such objects, which may also be referred to as a tracker, may periodically obtain measurement reports from one or more sensors, and the tracker may employ various algorithms to attempt to fuse the measurement reports into tracks, i.e., trends in the measurement reports, indicating for example the path over which an object has traveled. To form tracks, the tracker may make fusion decisions, including decisions about which set of measurement reports to fuse into a track. In some circumstances, these fusion decisions may be error-prone. A higher-level tracker, which may be referred to as a system tracker, may receive tracks from trackers and fuse them to form improved tracks.

Sensor systems are subjects of ongoing technological development and engineering, and as a result new sensor systems or capabilities become available from time to time. Modifying a tracker to accept data from a new sensor, or new data from an existing sensor, may be time-consuming and may involve a long development cycle. Thus, there is a need for a system for tracking objects capable of rapidly taking advantage of changes in sensors, and with reduced vulnerability to errors.

SUMMARY

In one embodiment, a system tracker may receive input from an operator and the operator input may assist the system tracker in making fusion decisions. Such a system tracker may be referred to as a coherent aggregator, providing a coherent set of tracks from various inputs.

According to an embodiment of the present invention there is provided a system for tracking a plurality of objects, including: a data interface configured to receive a plurality of data elements, each data element selected from the group consisting of: measurement reports including data about objects; and tracks, including inferred trends in data about objects; a user interface including a display and a user input device, the user interface coupled to the data interface and configured to display measurement reports and tracks; and a first coherent aggregator, coupled to the data interface and to the user interface, the first coherent aggregator configured to: receive at least one data element; receive user input from the user input device; generate a revised track in response to the data element and the user input; and provide the revised track to the display.

In one embodiment, the data interface is configured to receive data from an Integrated Broadcast Service (IBS) sensor.

In one embodiment, the data interface is configured to receive data from an Advanced Field Artillery Tactical Data System (AFATDS) system.

In one embodiment, the data interface is configured to receive data from an airborne radar sensor.

In one embodiment, the data interface is configured to receive data from an aircraft transmitting its position.

In one embodiment, the data interface is configured to receive data from a Blue Force Tracker (BFT) system.

In one embodiment, the data interface is configured to receive data from a ground-based mobile radar sensor.

In one embodiment, the first coherent aggregator is a battle control system (BCS).

In one embodiment, the first coherent aggregator is an Enhanced-OASIS Fusion Capability (E-OFC) system.

In one embodiment, the user interface is configured to enable a user to designate two icons corresponding to two tracks to be merged into one track.

In one embodiment, the first coherent aggregator is configured to receive user input comprising instructions to merge two tracks into one track.

In one embodiment, the first coherent aggregator is configured to receive user input comprising instructions to interchange two tracks.

In one embodiment, the system includes a second coherent aggregator, loosely coupled to the first coherent aggregator, and configured to communicate with the first coherent aggregator.

According to an embodiment of the present invention there is provided a method for tracking a plurality of objects, including: receiving a data element selected from the group consisting of: measurement reports including data about objects; and tracks, including inferred trends in data about objects; receiving user input; generating a revised track in response to the data element and the user input; and providing the revised track to a display.

In one embodiment, the receiving of user input includes: displaying a plurality of tracks on the display; enabling a user to select two tracks; and enabling a user to provide, as user input, an instruction to merge the two selected tracks.

In one embodiment, the enabling the user to select two tracks includes enabling the user to left click on a first one of the two tracks and enabling a user to right click on a second one of the two tracks.

In one embodiment, the enabling of the user to select two tracks includes enabling the user to drag a rectangle containing the two tracks.

In one embodiment, the method includes displaying information about an object of the plurality of objects.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of a method for coherent aggregation from multiple diverse sources on a single display provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
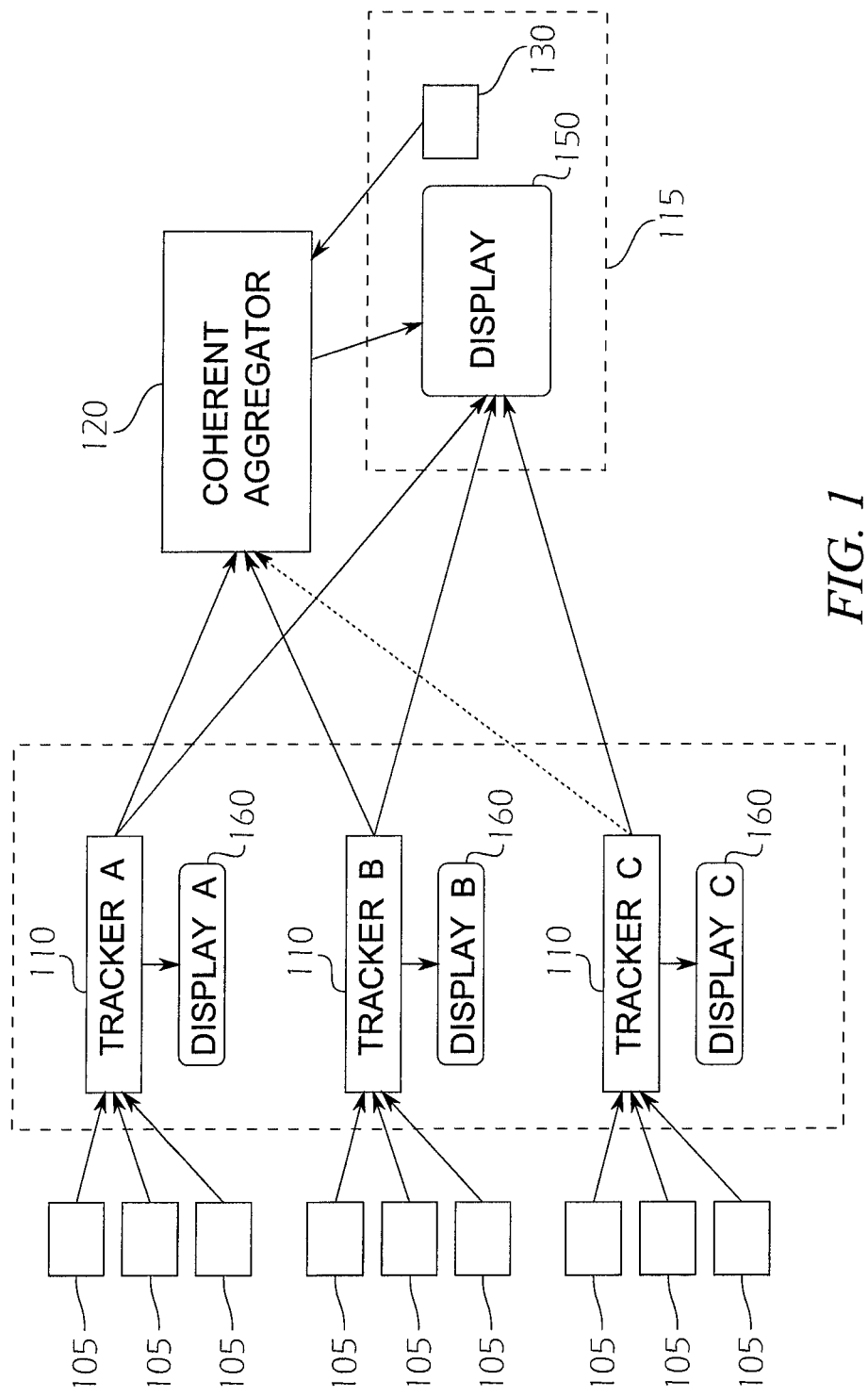
FIG. 1 is a block diagram of a coherent aggregator coupled to several trackers and to a display according to an embodiment of the present invention.

Referring to FIG. 1, in operation a system for tracking objects may include a number of sensors 105, each providing individual measurements which may be referred to as measurement reports. Each measurement report contains information about an object, taken at a point in time, or over a short interval of time. A measurement report may indicate the position and velocity of an object, and it may contain identifying information about the object. For example, a tracked object may be equipped with a Global Positioning System (GPS) receiver and a radio transmitter, and it may periodically transmit the tracked object's position to a receiver. The receiver in this case may act as a sensor 105. Some sensors, e.g., sensors in the Integrated Broadcast Service (IBS) may obtain information about objects by receiving communications transmitted by the objects. Such sensors may, for example, provide relatively accurate identifying information about tracked objects while providing relatively inaccurate position information. Other sensors, such as radar systems, may provide relatively accurate position information while providing less accurate identifying information.

It may be advantageous to aggregate, or fuse, multiple measurement reports into inferred trends, or time records of position, which may be referred to as tracks. For example, if a radar system has an aircraft in its field of regard, and forms a new observation of the aircraft every second, then the sequence of locations spaced one second apart forms a track which may also contain estimates of the current and past locations of the aircraft. The track is readily inferred by a human observer presented with consecutive dots on a screen, or by a computer which may connect consecutive observations in time-order to estimate the track position at any time in the past, current, and future. An automated system for inferring such a track from measurement reports may be referred to as a tracker.

If two aircraft are within the radar's field of regard, the problem of reconstructing or inferring a track for each aircraft may be more challenging, especially if the aircraft are near each other and if the aircraft are maneuvering. If a sufficiently long time interval elapses between measurement reports, then it may be difficult to determine which of two objects in a current set of measurement reports corresponds to which of the objects in previously obtained measurement reports. A tracker 110 may maintain a set of alternate hypotheses about candidate tracks, each candidate track fusing multiple measurement reports, and it may rank the hypotheses according to their likelihood in light of received measurement reports. The likelihood of a hypothesis may be influenced by uncertainty in a type identification, or by the degree of confidence in a position measurement, which in some embodiments may be characterized by an uncertainty ellipse.

A tracker 110 may receive measurement reports and create new or update existing tracks from them, making fusion decisions to do so, or it may also receive tracks from other trackers, in which case the tracker 110 may be referred to as a system tracker. For example, a system tracker may receive tracks from a first tracker using ground-based radar sensors, and from a second tracker using airborne radar sensors, and the system tracker may make fusion decisions to infer, for example, that a track received from the first tracker corresponds to the same physical object as a track received from the second tracker, i.e., that the two tracks received are better represented as a single track. By combining overlapping information from multiple sensors 105 or multiple trackers 110, a tracker or system tracker may produce more accurate or more reliable tracks.

A sensor 105 may be able to provide various types of information about a tracked object, such as what the platform of the object is, e.g., a particular type of vehicle, vessel, or aircraft. For example, radar returns from an aircraft may contain a characteristic signature which may indicate the type of engine or engines on the aircraft, in some cases making it possible to identify the model of aircraft. Such an identification may also be helpful in making fusion decisions in a tracker, which may have different models for possible behaviors, and use a model corresponding to the object's platform.

When sensor technology changes, e.g., as new types of sensor become available, or when existing sensors are upgraded with new capabilities, integrating the new sensors or sensor capabilities into existing trackers may be costly and time-consuming, because of the complexity of tracker algorithms, which result in a long development cycle.

Referring still to FIG. 1, in one embodiment, a system tracker is integrated with a user interface 115 allowing it to interact with an operator. In this configuration, i.e., when configured to accept input for use in making fusion decisions, from a human operator, the system tracker may be referred to as a coherent aggregator 120. A human operator may in some respects be able to make better fusion decisions than a tracker, and may instruct the tracker, using one or more operator input devices 130, to correct erroneous fusion decisions. Input devices 130 may include, for example, a keyboard and a mouse.

For example, a human operator may possess information, which may be referred to as general intelligence information, about the situation being observed, not readily supplied to a tracker. General intelligence information may include, for example, knowledge of the dispositions of enemy forces, e.g., the location of enemy bases from which enemy aircraft may approach, and familiarity with past behaviors of enemy forces. For example, an operator may be in communication with a friendly aircraft dispatched to intercept a hostile aircraft, and when the interceptor draws near to the hostile aircraft, both aircraft may begin to maneuver to avoid each other. In a situation with two aircraft near each other, both maneuvering rapidly, a tracker 110 may be particularly likely to err in identifying which object is the friendly aircraft and which is the hostile aircraft. The operator, however, may be able, by communicating with the interceptor pilot, to correctly identify the objects.

In one embodiment, a display may be configured to display a variety of tracks or measurement reports, or both, and a coherent aggregator 120 may be configured to accept input from a human operator, the input allowing the coherent aggregator 120 to make improved fusion decisions. For example, if a coherent aggregator 120 incorrectly labels a friendly aircraft as hostile, and vice versa, the operator may instruct the coherent aggregator 120 to correct the error. In another example, the coherent aggregator 120 may be generating two tracks near each other, e.g., apparently made by two aircraft flying close together, but the tracks may in fact correspond to only one physical object, observed for example by several independent sensors 105. In this case an experienced human operator may have general intelligence information allowing the operator to determine that what is displayed as two tracks should be displayed as a single track, and the operator may instruct the coherent aggregator to merge the tracks. In another example an operator may realize that the coherent aggregator 120 has incorrectly fused the tracks of two different objects, displaying them as a single track, and the operator may instruct the coherent aggregator 120 to treat the track as two separate tracks. In another example, an operator may know, e.g., from the disposition of enemy forces, that a platform identification a coherent aggregator 120 has made is incorrect, and the operator may instruct the coherent aggregator 120 to correct it. A human operator also may be able to learn fairly quickly to use data from a new sensor 105.

Interactions between an operator and a tracker 110 or coherent aggregator 120 may also be advantageous in other situations. In one example, a hostile aircraft may be equipped with a modified transponder causing it to transmit an identification number, which may be referred to as a tail number, belonging to a commercial aircraft, and the hostile aircraft may be flying along a path normally flown by commercial aircraft. A tracker 110 monitoring the locations of commercial aircraft, for example using transponder returns or filed flight plans, may have a database of aircraft and their locations, and it may display these locations, along with the tail number, to the operator. The operator may discover that the tail number reported by the hostile aircraft belongs to an aircraft the location of which is also reported to be elsewhere, and, in response, the operator may identify the hostile aircraft as suspect, using an operator input device in the user interface. In one embodiment, the tracker 110 assists the operator by displaying duplicate tail numbers in a particular color, drawing the operator's attention to them. As indicated by the dashed arrow of FIG. 1, in some instances a tracker may send information only to the display, and not to the coherent aggregator.

A system in which an operator participates or assists with fusion decisions may also be advantageous in reducing the time required to begin using a new sensor, or a new capability of an existing sensor. In one embodiment, raw measurement reports from the new sensor are sent directly to a display in a user interface, and displayed as points, identified for example by an icon 310 (FIG. 3) corresponding to the new sensor or by an icon representing some characteristic detected by the sensor, such as the platform type. The ability to display such icons 310 may be implemented using a relatively thin layer of interface software, which may be referred to as a display interface layer 250 (FIG. 2), costing considerably less than the integration of the new sensor or capabilities into a tracker, which may have a long development cycle. The operator may then use the newly available information to help guide fusion decision feedback provided by the operator to the coherent aggregator 120. In one embodiment, input from an operator is treated by a coherent aggregator as being highly reliable.

The trackers in the embodiment of FIG. 1 may also be equipped with engineering displays 160, which may display measurement reports or tracks, and which may be helpful for troubleshooting.

Figure 2:
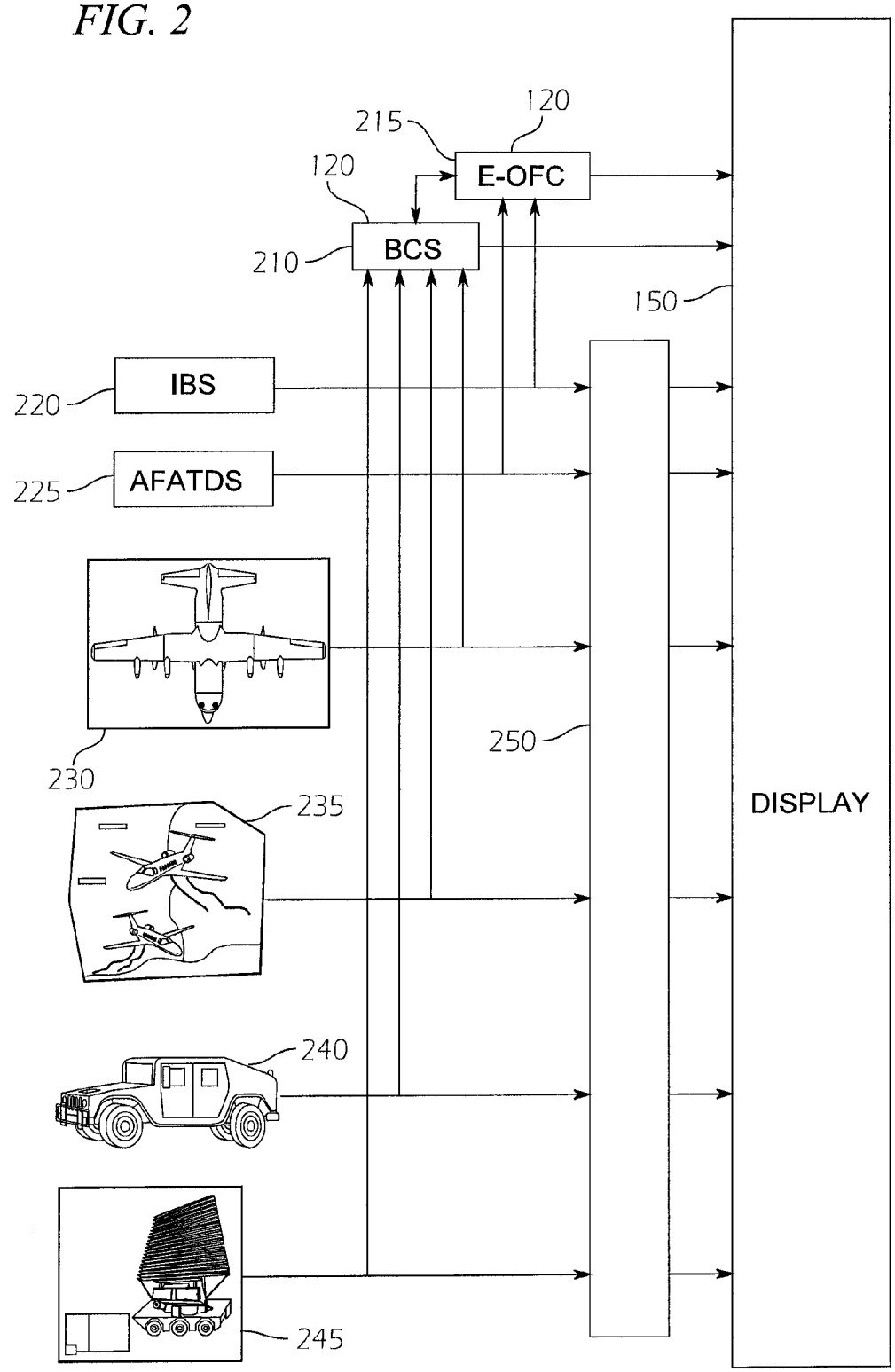
FIG. 2 is block diagram of two coherent aggregators coupled to trackers and sensor networks and to a display according to an embodiment of the present invention.

Referring to FIG. 2, in one embodiment two coherent aggregators 120, a battle control system (BCS) 210 and an Enhanced-OASIS Fusion Capability (E-OFC) system tracker 215 are each connected to several of a set of sensors or sensor networks, including an IBS 220, an Advanced Field Artillery Tactical Data System (AFATDS) 225, a network 230 of airborne radar sensors, a network 235 of aircraft each reporting its own position, a Blue Force Tracker (BFT) 240, and a network 245 of ground-based mobile radar sensors. Data from each sensor or network of sensors may also be fed, via a display interface layer 250, to the display.

The two coherent aggregators 120 may also communicate directly with each other. The coherent aggregators 120 may, for example, exchange tracks and track identifiers, allowing each coherent aggregator 120 to build a list of cross-references, in which its tracks are associated, by track identifier, with tracks received from the other coherent aggregator 120, in cases in which the tracks appear to correspond to the same physical object. The coherent aggregators 120 in an embodiment such as that of FIG. 2 may be complementary in the sense that the AFATDS 225 may provide relatively reliable identification information with relatively inaccurate position information and the network of ground-based mobile radar sensors 245 may provide relatively high accuracy position information with relatively poor identifying information. Similarly, one coherent aggregator 120, such as an E-OFC coherent aggregator 215, may provide relatively reliable identification information with relatively inaccurate position information, and another coherent aggregator 120, such as a BCS coherent aggregator 210, may provide relatively high accuracy position information with relatively poor identifying information. The two coherent aggregators 120 may be loosely coupled, which, as used herein, means that each coherent aggregator 120 has, or makes use of, little or no knowledge of the definitions of other separate coherent aggregators 120.

Figure 3:
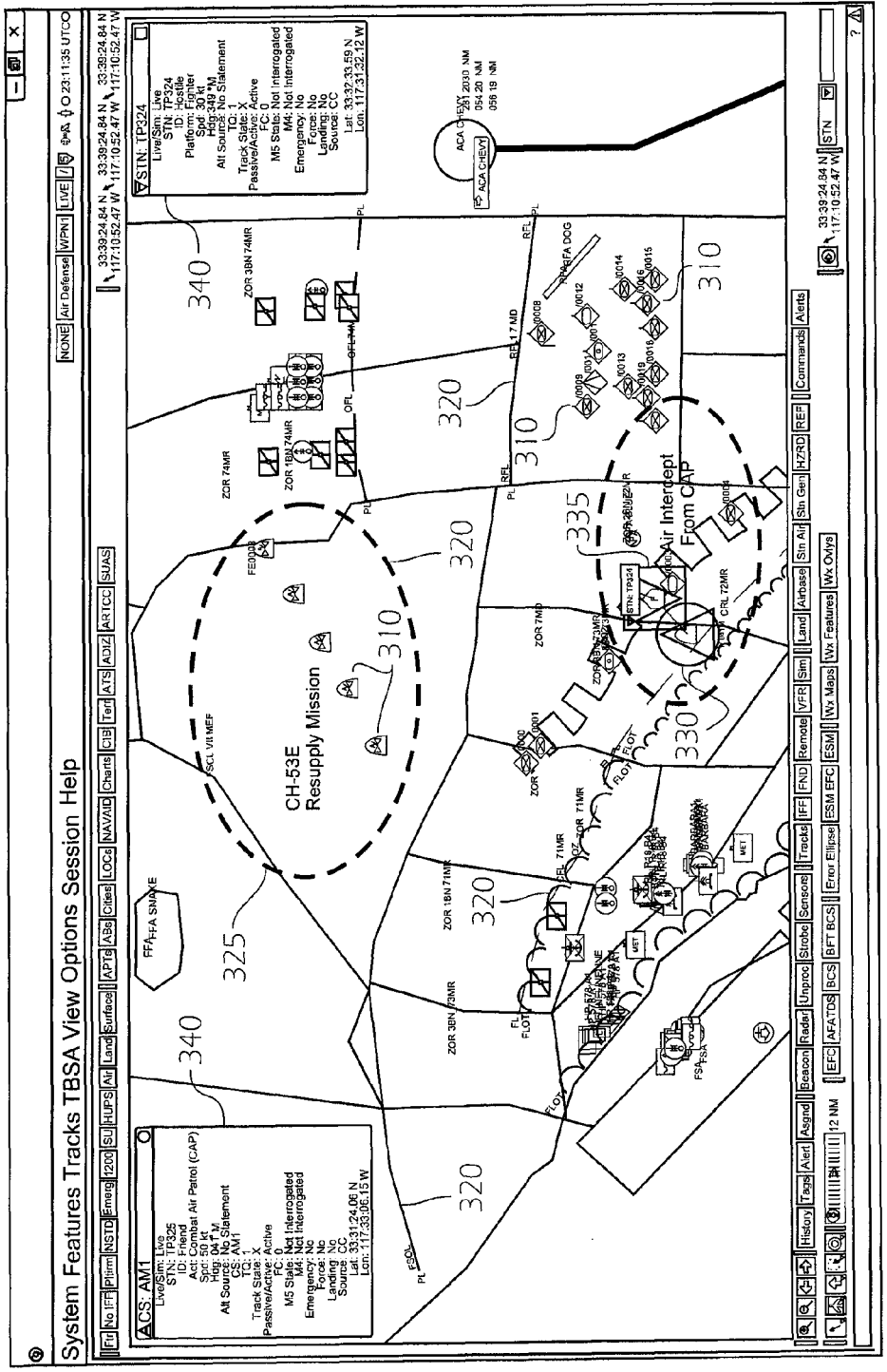
FIG. 3 is a screen shot of a display according to an embodiment of the present invention.

Referring to FIG. 3, in one embodiment a display may show, on a background representing a geographical area, a plurality of icons 310, each representing a tracked object. Icons 310 with different shapes may be used to represent ground vehicles, vessels, and aircraft, and different colors may be used to identify the objects as friendly, hostile, or suspect. Lines, or shapes formed from lines, referred to as geometries 320, may provide additional information to an operator viewing the display. For example, an ellipse 325 formed from a dashed line may be used to indicate that several objects within the ellipse are associated, e.g., they are a group of aircraft flying a resupply mission. A geometry 320 may also identify a boundary between geographic regions, a forward line of troops, or the like.

Using the display and an input device such as a mouse, an operator may designate two objects and execute a merge command to instruct the coherent aggregator(s) 120 that provided the tracks to merge the tracks corresponding to the two displayed objects into a single track, the operator having determined that the two displayed objects in fact correspond to a single physical object. To designate two objects, the operator may, for example, select a first object by left clicking on the corresponding icon, and then select a second object by right-clicking on it, or the operator may select both objects by dragging the mouse diagonally, which may result in the user interface displaying a rectangle with one corner at the location at which a mouse button was first pressed, and with the diagonally opposite corner at the current mouse location, or at the location at which the mouse button was released. Every object in the rectangle may become selected as a result. When an object is selected, the display may show a selected object identifier, such as a circle 330 or square 335 centered on the selected object. At the same time, the display may show an information box 340 containing information about the object, including, for example, a track identifier, the current location of the object, whether it is friendly, the type of platform, and its velocity. The track identifier may indicate the source of the data for the object, e.g., the track identifier may be an alphanumeric string with initial characters identifying a sensor network or tracker 110 that generated the position data for the object. The act of selecting an object may also be referred to as hooking the object.

In another example, if the operator has selected more than two objects, e.g., by drawing a rectangle including more than two objects, an information box 340 may be shown listing a number of selected objects, from which the operator may select two, on which to execute the merge command. The operator may be able to execute a merge command in any of several ways, including selecting a merge option from a drop-down menu which may be displayed in response to a right mouse click, or from a menu or submenu available at the top of the display window.

Figure 4:
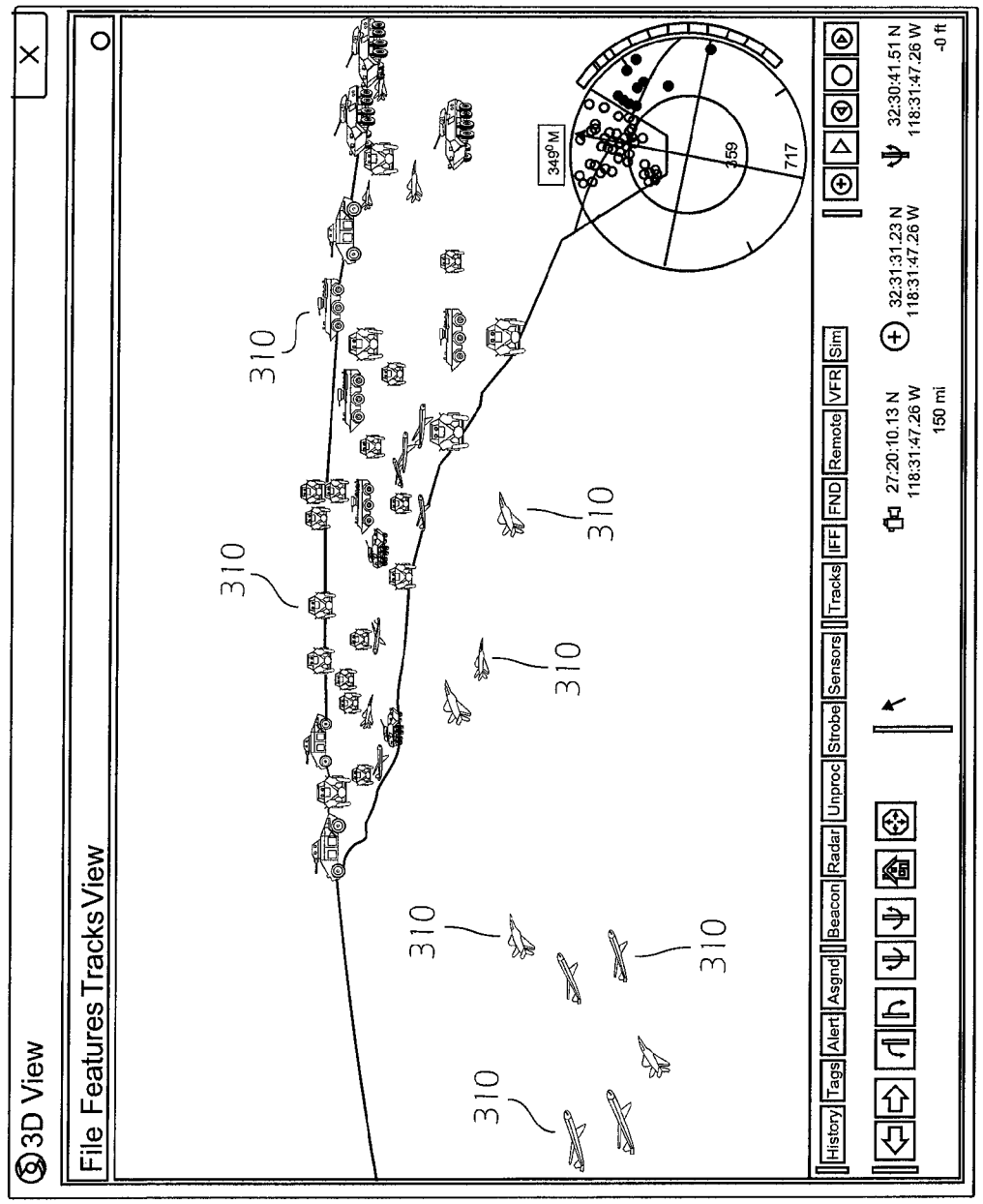
FIG. 4 is a screen shot of a display according to another embodiment of the present invention.

Referring to FIG. 4, in one embodiment, the display may show a simulated perspective view of a geographic area, with tracked objects represented by icons 310 drawn to approximate the shape of the object identified, with an aircraft shown as a shape resembling an aircraft, for example, and a ground vehicle shown as a shape resembling a ground vehicle. Both in the embodiment illustrated in FIG. 3, and in this embodiment, the operator may select several objects and instruct the coherent aggregator(s) 120 that provided the tracks to merge them, select two objects and instruct the coherent aggregator(s) 120 that provided the tracks to interchange their identities, or select one object and instruct the coherent aggregator 120 that provided the track to separate it into two.

Figure 5:
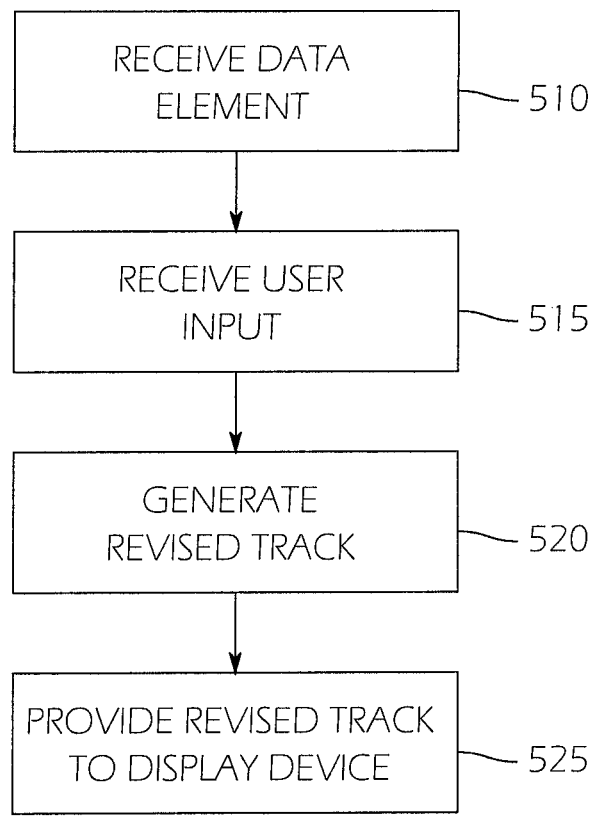
FIG. 5 is a flow chart of a method for tracking objects according to an embodiment of the present invention.

Referring to FIG. 5, acts involved in practicing an embodiment of the present invention may be illustrated with a flow chart. In an act 510 a coherent aggregator 120 receives at least one data element, where a data element may be a measurement report or a track. In an act 515 the coherent aggregator 120 receives user input, for example an instruction to merge two tracks. In an act 520, the coherent aggregator 120 revises at least one track in response to the received user input, and in an act 525, the coherent aggregator 120 displays the revised track, i.e., provides the revised track to a display device.

Although limited embodiments of a method for coherent aggregation from multiple diverse sources on a single display have been specifically described and illustrated herein, many modifications and variations will be apparent to those skilled in the art. Accordingly, it is to be understood that the method for coherent aggregation from multiple diverse sources on a single display employed according to principles of this invention may be embodied other than as specifically described herein. The invention is also defined in the following claims, and equivalents thereof.

What is claimed is:

1. A system for tracking a plurality of objects, comprising:
a data interface configured to receive a plurality of data elements, each data element selected from the group consisting of:
measurement reports comprising data about objects; and
tracks, comprising inferred trends in data about objects;
a user interface comprising a display and a user input device, the user interface coupled to the data interface and configured to display measurement reports and tracks; and
a first coherent aggregator, coupled to the data interface and to the user interface, the first coherent aggregator being configured to:
receive at least one data element;
receive user input from the user input device;
generate a revised track in response to the data element and the user input; and
provide the revised track to the display,
wherein the first coherent aggregator is configured to receive user input comprising an instruction selected from the group consisting of:
an instruction to treat a track as two separate tracks,
an instruction to merge two tracks into one track, and
an instruction to interchange two tracks.

2. The system of claim 1, wherein the data interface is configured to receive data from an Integrated Broadcast Service (IBS) sensor.

3. The system of claim 1, wherein the data interface is configured to receive data from an Advanced Field Artillery Tactical Data System (AFATDS) system.

4. The system of claim 1, wherein the data interface is configured to receive data from an airborne radar sensor.

5. The system of claim 1, wherein the data interface is configured to receive data from an aircraft transmitting its position.

6. The system of claim 1, wherein the data interface is configured to receive data from a Blue Force Tracker (BFT) system.

7. The system of claim 1, wherein the data interface is configured to receive data from a ground-based mobile radar sensor.

8. The system of claim 1, wherein the first coherent aggregator is a battle control system (BCS).

9. The system of claim 1, wherein the first coherent aggregator is an Enhanced-OASIS Fusion Capability (E-OFC) system.

10. The system of claim 1, wherein the user interface is configured to enable a user to designate two icons corresponding to two tracks to be merged into one track.

11. The system of claim 1, comprising a second coherent aggregator, loosely coupled to the first coherent aggregator, and configured to communicate with the first coherent aggregator.

12. A method for tracking a plurality of objects, comprising:
receiving, by a coherent aggregator, a data element selected from the group consisting of:
measurement reports comprising data about objects; and
tracks, comprising inferred trends in data about objects;
receiving, by the coherent aggregator, user input comprising an instruction selected from the group consisting of:
an instruction to treat a track as two separate tracks,
an instruction to merge two tracks into one track, and
an instruction to interchange two tracks;

generating, by the coherent aggregator, a revised track in response to the data element and the user input; and providing, by the coherent aggregator, the revised track to a display.

13. The method of claim 12, wherein the receiving of user input comprises:

displaying a plurality of tracks on the display;

enabling, by the coherent aggregator and a user input device, a user to select two tracks; and enabling, by the coherent aggregator and the user input device, a user to provide, as user input, an instruction to merge the two selected tracks.

14. The method of claim 13, wherein the enabling of the user to select two tracks comprises enabling the user to left click with a mouse on a first one of the two tracks and enabling a user to right click with the mouse on a second one of the two tracks.

15. The method of claim 13, wherein the enabling of the user to select two tracks comprises enabling the user to drag a rectangle, with a mouse, containing the two tracks.

16. The method of claim 12, comprising displaying, with the display, information about an object of the plurality of objects.

\* \* \* \* \*